(12) United States Patent
Mullins et al.

(10) Patent No.: US 8,413,432 B2
(45) Date of Patent: Apr. 9, 2013

(54) PARTICULATE FILTER REGENERATION INTERRUPTION SYSTEMS AND METHODS

(75) Inventors: Jason Daniel Mullins, Howell, MI (US); Paul Jasinkiewicz, Northville, MI (US); Kyle E. Crawford, Howell, MI (US); Justin A. Shetney, Livonia, MI (US); Rebecca J. Darr, Milford, MI (US)

(73) Assignee: GM Global Technology Operations LLC

( * ) Notice: Subject to any disclaimer, the term of this patent is extended or adjusted under 35 U.S.C. 154(b) by 128 days.

(21) Appl. No.: 12/826,872

(22) Filed: Jun. 30, 2010

(65) Prior Publication Data

US 2012/0000187 A1    Jan. 5, 2012

(51) Int. Cl.
*F01N 3/20* (2006.01)
*F01N 3/02* (2006.01)
*F01N 3/10* (2006.01)

(52) U.S. Cl.
USPC .......... 60/295; 60/274; 60/276; 60/285; 60/286; 60/297; 60/303; 60/311

(58) Field of Classification Search .......... 60/274, 60/276, 285, 286, 295, 297, 303, 311
See application file for complete search history.

(56) References Cited

U.S. PATENT DOCUMENTS

| | | | | |
|---|---|---|---|---|
| 2003/0213235 | A1* | 11/2003 | Kitahara et al. | 60/295 |
| 2007/0175208 | A1* | 8/2007 | Bandl-Konrad et al. | 60/286 |
| 2008/0104946 | A1* | 5/2008 | Wang et al. | 60/295 |
| 2010/0139252 | A1* | 6/2010 | Colet et al. | 60/286 |
| 2011/0146248 | A1* | 6/2011 | Charles et al. | 60/295 |

FOREIGN PATENT DOCUMENTS

| | | |
|---|---|---|
| DE | 10300298 A1 | 7/2004 |
| DE | 60302098 T2 | 6/2006 |

OTHER PUBLICATIONS

U.S. Appl. No. 12/796,062, filed Jun. 8, 2010, Mullins et al.
Office Action dated Nov. 30, 2012 from the German Patent Office for German Patent Application No. 10 2011 105 589.8; 5 Pages.

\* cited by examiner

*Primary Examiner* — Kenneth Bomberg
*Assistant Examiner* — Dapinder Singh (57) ABSTRACT

A regeneration control system for a vehicle includes a regeneration control module and a regeneration interrupt module. The regeneration control module selectively provides fuel to an oxidation catalyst for a regeneration event of a particulate filter that occurs during a predetermined melting period for frozen dosing agent. The regeneration interrupt module selectively interrupts the regeneration event and disables the provision of fuel to the oxidation catalyst before the regeneration event is complete when a temperature of a dosing agent injector that is located between the oxidation catalyst and the particulate filter is greater than a predetermined temperature.

21 Claims, 4 Drawing Sheets

PARTICULATE FILTER REGENERATION INTERRUPTION SYSTEMS AND METHODS

FIELD

The present disclosure relates to internal combustion engines and more particularly to exhaust treatment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel mixture to produce drive torque. Air is drawn into an engine through an intake manifold. A throttle valve controls airflow into the engine. The air mixes with fuel injected by one or more fuel injectors to form the air/fuel mixture. The air/fuel mixture is combusted within one or more cylinders of the engine. Combustion of the air/fuel mixture generates drive torque.

Exhaust resulting from the combustion of the air/fuel mixture includes particulate matter (PM) and exhaust gas. The exhaust gas includes nitrogen oxides (NOx), such as nitrogen oxide (NO) and nitrogen dioxide ($NO_2$). The PM may include hydrocarbons and carbon oxides. The exhaust is expelled from the engine to an exhaust system that includes a treatment system. The treatment system reduces the amounts of NOx and PM in the exhaust.

The treatment system includes an oxidation catalyst (OC), a dosing agent injector, a selective catalytic reduction (SCR) catalyst, and a particulate filter (PF). The OC removes (e.g., combusts) hydrocarbons and/or carbon oxides from the exhaust. The dosing agent injector injects a dosing agent into the exhaust stream at a location between the OC and the SCR catalyst. The SCR catalyst absorbs ammonia (NH3) provided by the dosing agent, and the NH3 reacts with NOx in the exhaust.

SUMMARY

A regeneration control system for a vehicle includes a regeneration control module and a regeneration interrupt module. The regeneration control module selectively provides fuel to an oxidation catalyst for a regeneration event of a particulate filter that occurs during a predetermined melting period for frozen dosing agent. The regeneration interrupt module selectively interrupts the regeneration event and disables the provision of fuel to the oxidation catalyst before the regeneration event is complete when a temperature of a dosing agent injector that is located between the oxidation catalyst and the particulate filter is greater than a predetermined temperature.

A regeneration control method for a vehicle, includes: selectively providing fuel to an oxidation catalyst for a regeneration event of a particulate filter that occurs during a predetermined melting period for frozen dosing agent; and selectively interrupting the regeneration event and disabling the provision of fuel to the oxidation catalyst before the regeneration event is complete when a temperature of a dosing agent injector that is located between the oxidation catalyst and the particulate filter is greater than a predetermined temperature.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC) configured to provide the described functionality, an electronic circuit configured to provide the described functionality, a processor (shared, dedicated, or group) and memory including one or more software or firmware programs that provide the described functionality, and/or a combinational logic circuit configured to provide the described functionality.

Injection of a dosing agent into an exhaust system may be controlled during normal engine operation to, for example, maximize a conversion efficiency of a selective catalytic reduction (SCR) catalyst and minimize ammonia (NH3) slip. The conversion efficiency of the SCR catalyst refers to a percentage of nitrogen oxides (NOx) removed from exhaust via reaction with NH3. NH3 slip occurs when, for example, NH3 is present downstream of the SCR catalyst.

The dosing agent may freeze at temperatures less than a freezing temperature of the dosing agent. When the dosing agent is frozen at engine startup, the frozen dosing agent may be warmed for a predetermined melting period. The injection of dosing agent may generally be disabled during the predetermined melting period.

However, regeneration of a particulate filter may be performed during the predetermined melting period under some circumstances. During particulate filter regeneration, heat is provided to the particulate filter via combustion of hydrocarbons (e.g., fuel) by an oxidation catalyst located upstream from the particulate filter. Since the dosing agent injector is located between the oxidation catalyst and the particulate filter, heat provided for particulate filter regeneration is also provided to the dosing agent injector.

A controller according to the present disclosure monitors a temperature of the dosing agent injector and selectively interrupts (i.e., disables) regeneration based on the temperature. More specifically, the controller may selectively interrupt regeneration when the temperature is greater than a predetermined temperature. The controller also determines whether to interrupt the regeneration based on other parameters, such as how long the temperature has been greater than the predetermined temperature, a loading amount of the particulate filter, a number of previous interruptions of the regeneration, whether one or more faults have been diagnosed, whether dosing agent injection is occurring, whether pressurized dosing agent is being provided to the dosing agent injector, and/or other suitable parameters.

Figure 1:
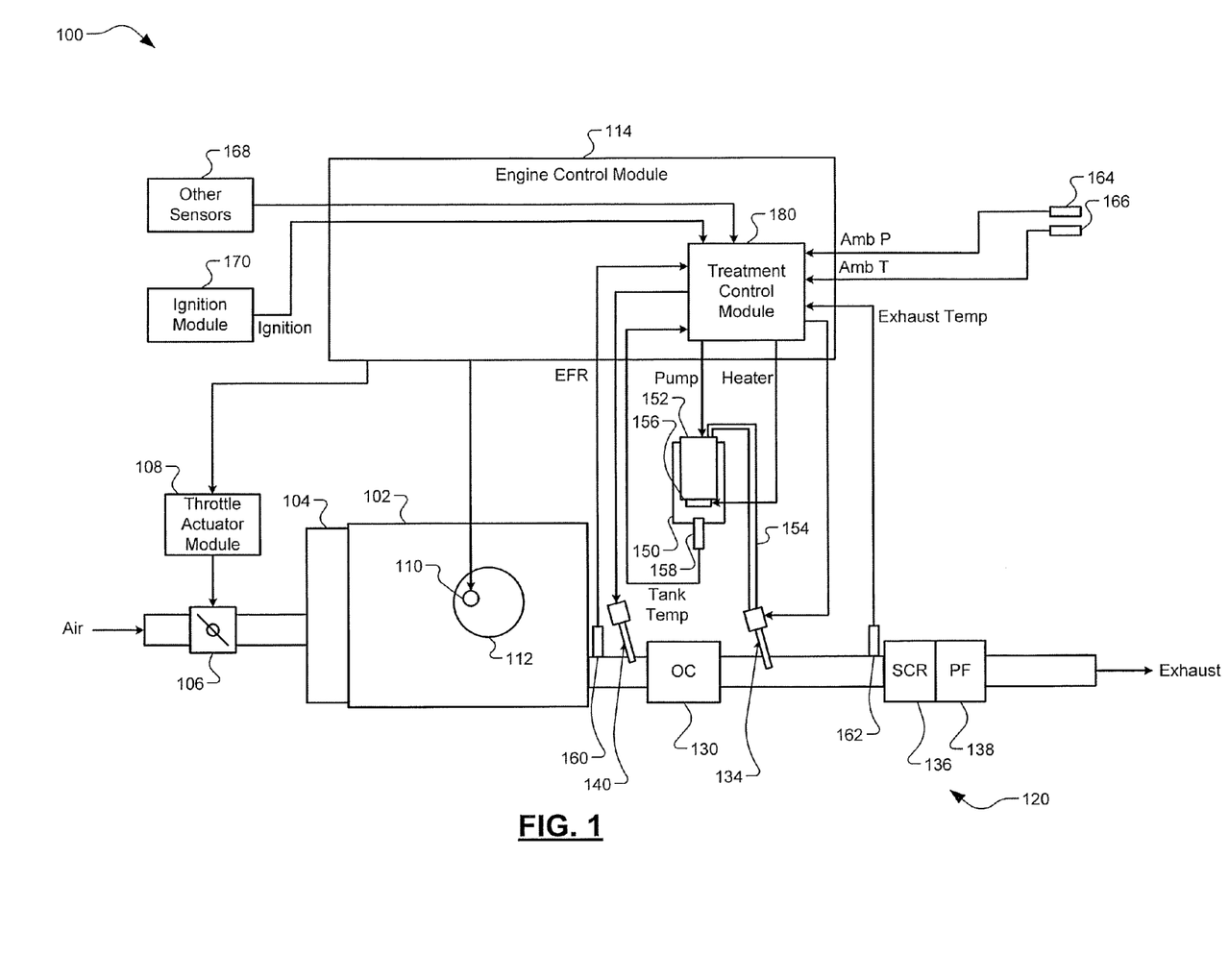
FIG. 1 is a functional block diagram of an exemplary engine system according to the principles of the present disclosure.

Referring now to FIG. 1, a functional block diagram of an exemplary engine system 100 is presented. An engine 102 combusts an air/fuel mixture to generate drive torque. While the engine 102 will be discussed as a diesel-type engine, the engine 102 may include a gasoline-type engine, a hybrid-type engine, and/or another suitable type of engine.

Air is drawn into the engine 102 through an intake manifold 104. A throttle valve 106 controls airflow into the engine 102. A throttle actuator module 108 controls opening of the throttle valve 106. For example only, the throttle actuator module 108 may include an electronic throttle controller (ETC). The air mixes with fuel injected by one or more fuel injectors, such as fuel injector 110. The air/fuel mixture is combusted within one or more cylinders of the engine 102, such as cylinder 112. Combustion of the air/fuel mixture generates torque. An engine control module (ECM) 114 controls the torque output of the engine 102.

Exhaust resulting from the combustion of the air/fuel mixture is expelled from the engine 102 to an exhaust system 120. The exhaust includes particulate matter (PM) and exhaust gas. The exhaust gas includes nitrogen oxides (NOx), such as nitrogen oxide (NO) and nitrogen dioxide ($NO_2$). The PM may include hydrocarbons and carbon oxides. The exhaust system 120 includes a treatment system that reduces the amounts of NOx and PM in the exhaust.

The treatment system includes an oxidation catalyst (OC) 130, a dosing agent injector 134, a selective catalytic reduction (SCR) catalyst 136, and a particulate filter (PF) 138. For example only, the OC 130 may include a diesel oxidation catalyst (DOC), and the PF 138 may include a diesel particulate filter (DPF). In various implementations, the SCR catalyst 136 and the PF 138 may be implemented within a common housing. The treatment system may also include a hydrocarbon injector 140. The hydrocarbon injector 140 may inject hydrocarbons, such as fuel, into the exhaust system upstream of the OC 130.

The exhaust flows from the engine 102 to the OC 130. The OC 130 reduces (e.g., combusts) hydrocarbons and carbon oxides in the exhaust. The dosing agent injector 134 injects a dosing agent into the exhaust system 120 at a location between the OC 130 and the SCR catalyst 136. For example only, the dosing agent may include urea, ammonia, or another suitable dosing agent that provides ammonia (hereafter "NH3") to the SCR catalyst 136. A tip of the dosing agent injector 134 may extend into the exhaust system 120 as shown in the exemplary embodiment of FIG. 1. In other implementations, the tip may not extend into the exhaust system 120.

The PF 138 filters PM from the exhaust, and PM filtered from the exhaust collects within the PF 138. PM is periodically cleared (e.g., burned) from the PF 138 through a process referred to as regeneration, which is discussed further below. The SCR catalyst 136 stores (i.e., absorbs) NH3 supplied by dosing agent. An exemplary chemical equation that is illustrative of NH3 absorption by the SCR catalyst 136 is provided below.

The SCR catalyst 136 catalyzes a reaction between the stored NH3 and NOx in the exhaust. For example only, the SCR catalyst 136 may include a vanadium catalyst and/or a zeolite catalyst.

In various implementations, the dosing agent may be diluted with, for example, water. In such implementations, heat from the exhaust may evaporate the water, thereby resulting in the provision of NH3 to the SCR catalyst 136. An exemplary chemical equation that is illustrative of the production of NH3 from a dosing agent solution is provided below.

The treatment system also includes a tank 150, a pump 152, a connecting line 154, and a heater 156. Dosing agent is stored in the tank 150. The pump 152 draws the dosing agent from the tank 150 and pressurizes the dosing agent in the connecting line 154. The ECM 114 controls operation of the pump 152. In other words, the ECM 114 controls provision of pressurized dosing agent to the dosing agent injector 134. The ECM 114 may control operation of the pump 152 using a pump signal.

The heater 156 warms the dosing agent stored within the tank 150. The heater 156 may include, for example, a resistive heater. While not shown in the exemplary embodiment of FIG. 1, one or more additional dosing agent heaters may be included and may be collectively represented by the heater 156. For example only, the treatment system may include a heater that warms dosing agent in the connecting line 154 and a heater that warms the dosing agent injector 134.

In some implementations, a temperature of the heater 156 may be self-regulated. For example only, resistance of the heater 156 may change as the heater temperature changes to regulate the heater temperature at approximately a predetermined melting temperature. In some implementations, the heater temperature may be regulated by a module, such as the ECM 114, as shown in the exemplary embodiment of FIG. 1. The ECM 114 may control the heater temperature by controlling application of power to the heater 156 using a heater signal.

Various sensors may be implemented throughout the engine system 100. For example only, a tank temperature sensor 158 measures a temperature within the tank 150 (i.e., a tank temperature). An exhaust flow rate (EFR) sensor 160 measures a mass flowrate of the exhaust output by the engine 102. The mass flowrate of the exhaust may be referred to as the exhaust flow rate (EFR). An exhaust temperature sensor 162 measures an exhaust temperature at a location between the OC 130 and the PF 138. Ambient pressure and temperature sensors 164 and 166 measure pressure (Amb P) and temperature (Amb T) of ambient air, respectively.

The engine system 100 may also include other sensors 168, such as a temperature sensor upstream of the OC 130, a temperature sensor downstream of the PF 138, oxygen sensors, NOx sensors upstream and downstream of the PF 138, a pressure sensor measuring pressure of the dosing agent provided to the dosing agent injector 134, and other suitable sensors. The other sensors 168 may additionally or alternatively include a manifold absolute pressure (MAP) sensor, a mass air flow (MAF) sensor, a throttle position sensor (TPS), an intake air temperature (IAT) sensor, and/or other sensor(s). An ignition module 170 generates ignition signals based on vehicle operation commands input via an ignition system (not shown). For example only, the ignition module 170 may generate vehicle startup and vehicle shutdown commands based on user inputs to the ignition system.

A treatment control module 180 controls the mass flow rate at which the dosing agent is injected into the exhaust system 120 (e.g., g/s). The treatment control module 180 may control the injection of dosing agent, for example, to maximize the percentage of NOx that is removed from the exhaust via reaction with NH3 during normal engine operation. The treatment control module 180 also controls the injection of dosing agent to minimize NH3 slip. NH3 slip occurs when NH3 is present downstream of the SCR catalyst 136. For example only, NH3 slip may occur when more NH3 is supplied to the SCR catalyst 136 than the SCR catalyst 136 is capable of storing or when NH3 is released (i.e., desorbs) from the SCR catalyst 136.

The dosing agent may freeze at temperatures less than a freezing point temperature of the dosing agent. For example only, the freezing point temperature of the dosing agent may be approximately −11° C. A limited amount of liquid dosing agent may be present in the tank 150 when the tank temperature is less than the freezing point temperature upon and shortly after an engine startup.

Dosing agent cannot be drawn from the tank 150 until some liquid dosing agent is present in the tank 150. Drawing all of the liquid dosing agent from the tank 150 before frozen dosing agent melts may cause a cavity to form in the frozen dosing agent within the tank 150. As liquid dosing agent may be an effective heat transfer medium between the heater 156 and the frozen dosing agent, removal of liquid dosing agent from the tank 150 may slow the melting of the frozen dosing agent.

Thus, the treatment control module 180 generally disables dosing agent injection during a predetermined period after an engine startup when the tank temperature is less than the freezing point temperature at engine startup. This predetermined period may be referred to as a melting period. For example only, the melting period may be set based on guidance from one or more governmental bodies and may include approximately 70 minutes of engine runtime.

During the melting period, the treatment control module 180 may perform regeneration of the PF 138. Regeneration of the PF 138 includes combustion of PM trapped within the PF 138. Combustion of PM may be accomplished at high temperatures, such as temperatures greater than approximately 600° C.

The treatment control module 180 may provide hydrocarbons (e.g., fuel) to the OC 130 for regeneration of the PF 138. The OC 130 combusts the hydrocarbons, the combustion produces heat, and the heat is carried by the exhaust downstream to the PF 138. In other words, heat from combustion at the OC 130 may be used to create the temperature conditions necessary for combustion of PM trapped within the PF 138.

The hydrocarbon injector 140 may inject the hydrocarbons (e.g., fuel) into the exhaust system 120 for regeneration of the PF 138. The treatment control module 180 may control the provision of hydrocarbons by the hydrocarbon injector 140. Additionally or alternatively, the treatment control module 180 may alter combustion within the engine 102 (e.g., late fueling) such that hydrocarbons are expelled from the engine 102 with the exhaust and provided to the OC 130.

As the dosing agent injector 134 is located downstream of the OC 130, however, the tip of the dosing agent injector 134 also receives heat for regeneration of the PF 138. In some instances, this heat may cause the temperature of the tip of the dosing agent injector 134 to exceed a predetermined maximum temperature. For example only, the predetermined maximum temperature may be set based on a boiling point temperature of the dosing agent and may be set to approximately 120° C. The dosing agent may turn acidic at temperatures greater than the predetermined maximum temperature, and the acid may damage the dosing agent injector 134. Further, the resulting acid may be ineffective in reacting with NOx.

The treatment control module 180 may selectively prime the pump 152 during a PF regeneration that is performed within the melting period. In other words, the treatment control module 180 may provide pressurized dosing agent to the dosing agent injector 134 during the melting period. The provision of cooler dosing agent to the warmer dosing agent injector 134 may cool the tip of the dosing agent injector 134. More specifically, heat from the dosing agent injector 134 may be transferred away from the warmer dosing agent injector 134 and to the cooler dosing agent.

The treatment control module 180 of the present disclosure selectively interrupts a regeneration of the PF 138 based on various parameters. For example only, the treatment control module 180 selectively interrupts the regeneration when the tip temperature is greater than the predetermined maximum temperature.

Even when the tip temperature is greater than the predetermined maximum temperature, however, the treatment control module 180 may selectively prevent an interruption of an ongoing regeneration and continue the regeneration under some circumstances. For example only, the treatment control module 180 may refrain from interrupting and continue the regeneration when the tip temperature has been greater than the predetermined maximum temperature for a predetermined period, when the pump 152 is providing pressurized dosing agent to the dosing agent injector 134, when dosing agent injection is being performed, when one or more faults have been diagnosed in the treatment system, when the regeneration should be continued due to loading of the PF 138, and/or when the regeneration has been interrupted on a predetermined number of occasions.

Figure 2A:
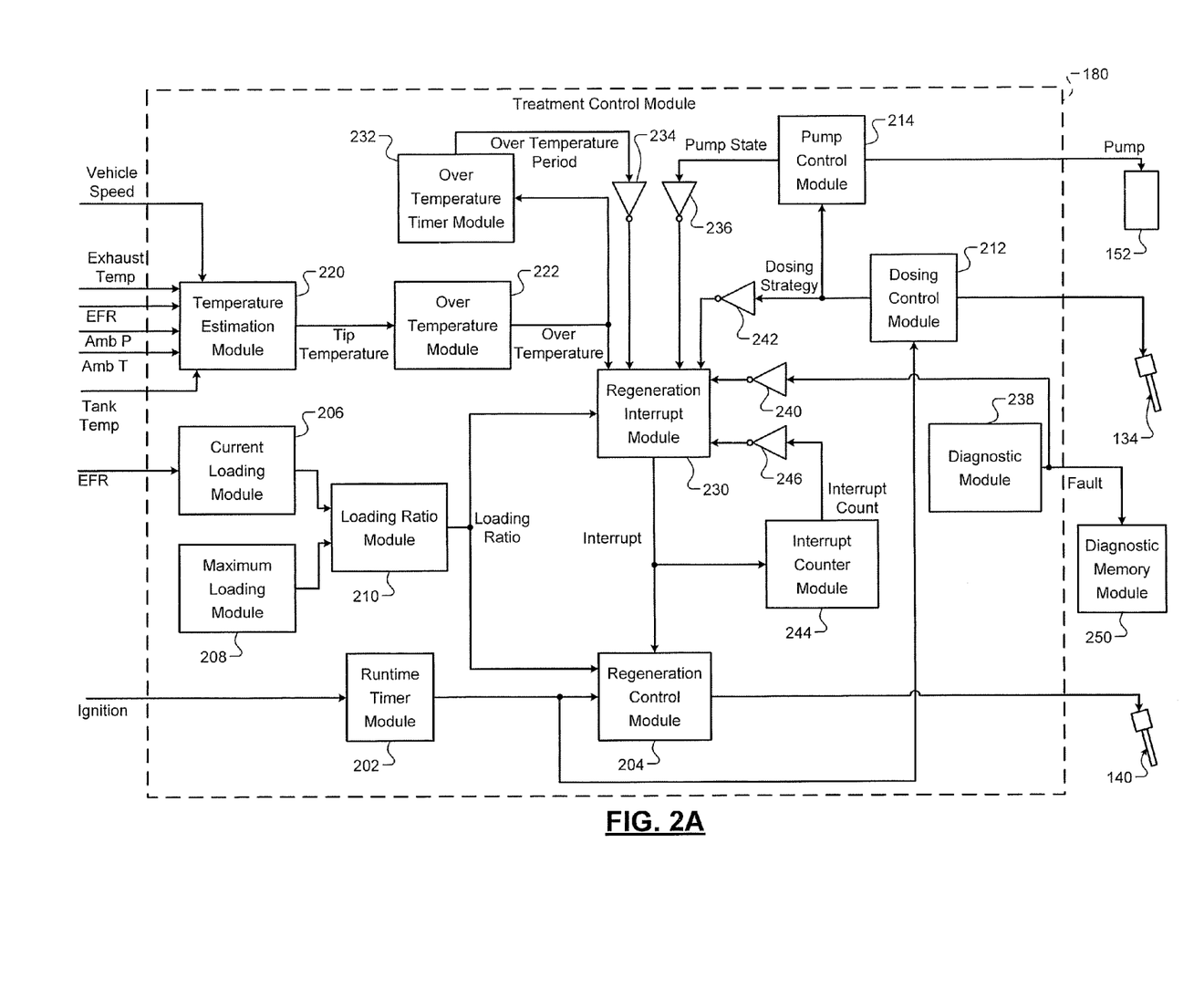
FIGS. 2A-2B are functional block diagrams of exemplary treatment control modules according to the principles of the present disclosure.
Figure 2B:
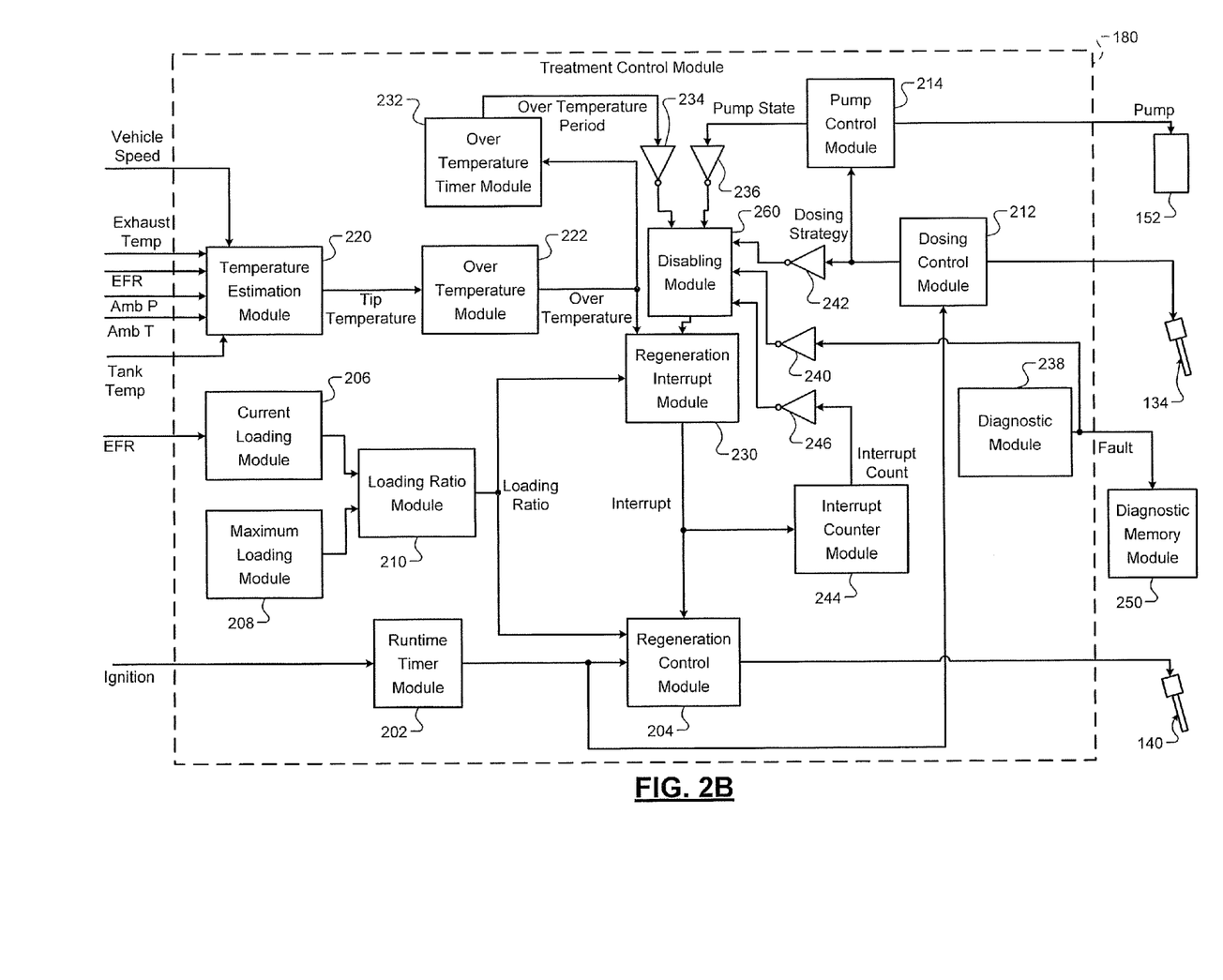

Referring now to FIGS. 2A-2B, functional block diagrams of exemplary implementations of the treatment control module 180 are presented. The treatment control module 180 may include a runtime timer module 202, a regeneration control module 204, a current loading module 206, a maximum loading module 208, and a loading ratio module 210. The treatment control module 180 may also include a dosing control module 212, a pump control module 214, a temperature estimation module 220, an over temperature module 222, and a regeneration interrupt module 230. The treatment control module 180 may also include an over temperature timer module 232, a diagnostic module 238, an interrupt counter module 244, and inverter modules 234, 236, 240, 242, and 246.

The runtime timer module 202 may reset an engine runtime timer each time when the engine 102 (or vehicle) is started. The runtime timer module 202 may thereafter increment the engine runtime timer as the engine 102 runs. In this manner, the runtime timer module 202 tracks the period elapsed since the startup of the engine 102. In other words, the runtime timer module 202 tracks the engine runtime period.

The regeneration control module 204 controls regeneration of the PF 138. For example only, the regeneration control module 204 may control the provision of fuel to the OC 130 to initiate and for the performance of a regeneration event of the PF 138. The regeneration control module 204 may determine whether to regenerate the PF 138 based on, for example, a current loading of the PF 138.

The current loading of the PF 138 may refer to a mass (e.g., g) of PM within the PF 138. The current loading module 206 may determine the current loading of the PF 138 based on various parameters. For example only, the current loading module 206 may determine the current loading of the PF 138 based on one or more of the EFR, a pressure difference across the PF 138, a distance traveled since a last regeneration of the PF 138 was performed, and an amount of fuel provided to the engine 102 since the last regeneration.

The regeneration control module 204 may regenerate the PF 138, for example, when the current loading is greater than a maximum loading of the PF 138. The maximum loading may refer to a mass (e.g., g) of PM within the PF 138 above which regeneration should generally be performed. The maximum loading module 208 may determine the maximum loading. For example only, maximum loading may be a predetermined loading, such as approximately 44 g. The maximum loading may also be adjusted based on a mass of ash remaining within the PF 138 after one or more previous regenerations of the PF 138.

In some implementations, the regeneration control module 204 may determine whether to initiate regeneration of the PF 138 based on a loading ratio. The loading ratio module 210 may determine the loading ratio based on the current loading and the maximum loading. For example only, the loading ratio module 210 may determine the loading ratio based on a quotient of the current loading and the maximum loading. The regeneration control module 204 may regenerate the PF 138, for example, when the loading ratio exceeds a predetermined value, such as approximately 1.0.

Generally, the dosing control module 212 may disable the injection of dosing agent and disable the provision of pressurized dosing agent to the dosing agent injector 134 during the melting period. Under some circumstances, however, the dosing control module 212 may provide pressurized dosing agent to the dosing agent injector 134 during the melting period. For example only, the dosing control module 212 may selectively prime the pump 152 during the melting period.

The dosing control module 212 may also inject dosing agent during the melting period under some circumstances, such as during regeneration of the PF 138. The dosing control module 212 may generate a dosing strategy signal that indicates whether dosing agent injection is being performed. The dosing strategy signal may also indicate whether pressurized dosing agent should be provided to the dosing agent injector 134.

The pump control module 214 may control the operation of the pump 152 based on the request of the dosing control module 212. More specifically, the pump control module 214 may control the operation of the pump 152 based on the dosing strategy signal. For example only, the pump control module 214 may operate the pump 152 when the dosing strategy signal indicates that pressurized dosing agent should be provided and/or when dosing agent injection is being performed.

The pump control module 214 may generate a pump state signal that indicates whether operation of the pump 152 is being performed. For example only, the pump control module 214 may set the pump state signal to an active state (e.g., 5 V) when the pump 152 is being operated or when the pump 152 is being primed.

The temperature estimation module 220 estimates the tip temperature based on various parameters. For example only, the temperature estimation module 220 may estimate the tip temperature based on vehicle speed, the exhaust temperature, the EFR, the ambient pressure, the ambient temperature, and the tank temperature. The vehicle speed may be determined based on a transmission speed, a wheel speed, or another suitable speed indicative of the vehicle speed.

The over temperature module 222 may generate an over temperature signal based on a comparison of the tip temperature and the predetermined maximum temperature. More specifically, the over temperature module 222 may set a state of the over temperature signal based on whether the tip temperature is greater than the predetermined maximum temperature. For example only, the over temperature module 222 may set the over temperature signal to an active state (e.g., 5 V) when the tip temperature is greater than the predetermined maximum temperature. Otherwise, the over temperature module 222 may set the over temperature signal to an inactive state (e.g., 0 V).

The regeneration interrupt module 230 selectively interrupts an ongoing regeneration of the PF 138 when the tip temperature is greater than the predetermined maximum temperature. The regeneration interrupt module 230 determines whether to interrupt the regeneration of the PF 138 based on, for example, a period that the tip temperature has been greater than the predetermined maximum temperature.

For example only, the regeneration interrupt module 230 may interrupt the regeneration when the tip temperature is greater than the predetermined maximum temperature for less than a predetermined period. Written conversely, the regeneration interrupt module 230 may disable interrupting the regeneration when the tip temperature is greater than the predetermined maximum temperature for at least the predetermined period.

The over temperature timer module 232 receives the over temperature signal from the over temperature module 222 and tracks the period that the tip temperature has been greater than the predetermined maximum temperature (i.e., over temperature period). For example only, the over temperature timer module 232 may increment a timer as time passes while the tip temperature is greater than the predetermined maximum temperature. In this manner, the over temperature timer module 232 tracks the over temperature period.

The over temperature timer module 232 compares the over temperature period with the predetermined period and generates an over temperature period signal based on the comparison. For example only, the over temperature timer module 232 may set the over temperature period signal to an active state (e.g., 5 V) when the over temperature period is greater than or equal to the predetermined period. When the over temperature period is less than the predetermined period, the over temperature timer module 232 may set the over temperature period signal to an inactive state (e.g., 0 V). For example only, the predetermined period may be approximately 10 minutes. In various implementations, the over temperature timer module 232 may set the over temperature period signal to the active state when the over temperature signal is in the active state or the over temperature timer module 232 may be omitted.

The inverter module 234 receives the over temperature period signal and provides an inverted over temperature period signal to the regeneration interrupt module 230. More specifically, the inverter module 234 may invert the state of the over temperature signal and provide the inverted version of the over temperature period signal to the regeneration interrupt module 230. In this manner, the inverter module 234 may provide the regeneration interrupt module 230 with a signal in the inactive state when the over temperature period is greater than or equal to the predetermined period. The regeneration interrupt module 230 may interrupt the regeneration when the signal is in the active state.

Before interrupting the regeneration, the regeneration interrupt module 230 may also require that the loading ratio be less than a predetermined maximum ratio. In other words, the regeneration interrupt module 230 may require that the current loading of the PF 138 be less than a predetermined loading before interrupting the regeneration. Written conversely, the regeneration interrupt module 230 may disable interrupting the regeneration when the current loading is greater than the predetermined loading. For example only, the predetermined loading may be a predetermined amount or percentage greater than the maximum loading, such as 25 percent greater than the maximum loading. In other words, the predetermined maximum ratio may be approximately 1.25. The current loading used in determining whether to interrupt the regeneration may be, for example, the current loading used in determining to initiate the regeneration.

Before interrupting the regeneration, the regeneration interrupt module 230 may also require that the pump 152 is not being operated. Written conversely, the regeneration interrupt module 230 may disable interrupting the regeneration when the pump 152 is being operated.

The inverter module 236 may receive the pump state signal from the pump control module 214, which indicates whether the pump 152 is being operated. The inverter module 236 may provide an inverted pump state signal to the regeneration interrupt module 230. More specifically, the inverter module 236 may invert the state of the pump state signal and provide the inverted version of the pump state signal to the regeneration interrupt module 230. In this manner, the inverter module 236 may provide the regeneration interrupt module 230 with a signal in the inactive state when the pump 152 is being operated. The regeneration interrupt module 230 may interrupt the regeneration when the signal is in the active state.

Before interrupting the regeneration, the regeneration interrupt module 230 may also require that no faults be present in the treatment system. Written conversely, the regeneration interrupt module 230 may disable interrupting the regeneration when one or more faults have been diagnosed in the treatment system.

The diagnostic module 238 may diagnose faults in one or more components of the treatment system and generate a fault signal when one or more faults have been diagnosed. Information pertaining to the one or more diagnosed faults may be stored in a diagnostic memory module 250. Fault information stored in the diagnostic memory module 250 may be used, for example, for selective illumination of a malfunction indicator lamp (not shown) and aid a service technician in servicing the vehicle. The diagnostic module 238 may diagnose faults in, for example, the pump 152, the heater 156, the dosing agent injector 134, the hydrocarbon injector 140, one or more sensors, and/or other components of the treatment system and/or the exhaust system 120.

The diagnostic module 238 may generate a fault signal that indicates whether one or more faults have been diagnosed in the treatment system. For example only, the diagnostic module 238 may set the fault signal to an active state (e.g., 5 V) when one or more faults have been diagnosed. The diagnostic module 238 may set the fault signal to an inactive state (e.g., 0 V) when no faults have been diagnosed.

The inverter module 240 may receive the fault signal and provide an inverted fault signal to the regeneration interrupt module 230. More specifically, the inverter module 240 may invert the state of the fault signal and provide the inverted version of the fault signal to the regeneration interrupt module 230. In this manner, the regeneration interrupt module 230 may interrupt the regeneration when the inverted fault signal is in the active state.

Before interrupting the regeneration, the regeneration interrupt module 230 may also require that the injection of dosing agent is not being performed. Written conversely, the regeneration interrupt module 230 may disable interrupting the regeneration of the PF 138 when dosing agent injection is being performed.

The inverter module 242 may receive the dosing strategy signal from the dosing control module 212, which indicates whether dosing agent injection is being performed. The inverter module 242 may provide an inverted dosing strategy signal to the regeneration interrupt module 230 based on the dosing strategy signal. More specifically, the inverter module 242 may invert the state of the dosing strategy signal and provide the inverted version of the dosing strategy signal to the regeneration interrupt module 230. In this manner, the regeneration interrupt module 230 may interrupt the regeneration when the inverted dosing strategy signal is in the active state.

Before interrupting the regeneration, the regeneration interrupt module 230 may also require that the regeneration of the PF 138 have been interrupted on less than a predetermined number of instances since a last regeneration of the PF 138. Written conversely, the regeneration interrupt module 230 may disable interrupting the regeneration when the regeneration has been interrupted on at least the predetermined number of instances since the last regeneration.

The regeneration interrupt module 230 generates an interrupt signal that indicates whether the regeneration control module 204 should interrupt the regeneration of the PF 138. For example only, the regeneration interrupt module 230 may set the interrupt signal to an active state (e.g., 5 V) when the regeneration should be interrupted. When the regeneration should not be interrupted, the regeneration interrupt module 230 may set the interrupt signal to an inactive state (e.g., 0 V). The regeneration control module 204 may selectively interrupt the regeneration when the interrupt signal is in the active state.

To interrupt the regeneration, the regeneration control module 204 may disable the provision of fuel to the OC 130. The regeneration control module 204 may also perform one or more interrupting actions. The interruption of the regeneration may allow the tip temperature to cool below the predetermined maximum temperature.

The interrupt counter module 244 monitors the state of the interrupt signal and counts a number of instances that the regeneration has been interrupted since the last regeneration. More specifically, the interrupt counter module 244 may count a number of times that the interrupt signal has transitioned from the inactive state to the active state. The interrupt counter module 244 may reset the counter when a regeneration of the PF 138 has been completed. In this manner, the interrupt counter module 244 may track the number of instances that the regeneration has been interrupted since the last regeneration.

The interrupt counter module 244 generates an interrupt counter signal based on whether the regeneration has been interrupted on less than the predetermined number of instances since the last regeneration. For example only, the interrupt counter module 244 may set the interrupt count signal to an active state (e.g., 5 V) when the regeneration has been interrupted less than the predetermined number of instances since the last regeneration. When the regeneration has been interrupted on at least the predetermined number of instances, the interrupt counter module 244 may set the interrupt count signal to an inactive state (e.g., 0 V). For example only, the predetermined number may be approximately 10.

The inverter module 246 receives the interrupt count signal and provides an inverted interrupt count signal to the regeneration interrupt module 230. More specifically, the inverter module 246 may invert the state of the interrupt count signal and provide an inverted version of the interrupt count signal to the regeneration interrupt module 230. In this manner, the regeneration interrupt module 230 may interrupt the regeneration when the inverted interrupt count signal is in the active state (i.e., when the regeneration has been interrupted on less than the predetermined number of instances).

In summary, the regeneration interrupt module 230 may interrupt the regeneration of the PF 138 when the following conditions occur: (1) the tip temperature is greater than the predetermined maximum temperature; (2) the tip temperature is greater than the predetermined maximum temperature for less than the predetermined period of time; (3) the pump 152 is not being operated to provide pressurized dosing agent to the dosing agent injector 134; (4) dosing agent injection is not being performed; (5) no faults have been diagnosed in the treatment system; (6) the loading ratio is less than the predetermined maximum loading ratio; and (7) the regeneration has been interrupted on less than the predetermined number of instances since the last regeneration. Otherwise, the regeneration interrupt module 230 may allow the regeneration to continue.

Referring now to FIG. 2B, the treatment control module 180 may also include a disabling module 260. When enabled, the regeneration interrupt module 230 may interrupt the regeneration when the tip temperature is greater than a predetermined temperature.

The disabling module 260 may selectively disable the regeneration interrupt module 230 and thereby prevent an interruption of a regeneration event. The disabling module 260 may disable the regeneration interrupt module 230 based on the current loading (or the loading ratio) and the states of the inverted over temperature signal, the inverted pump state signal, the inverted dosing strategy signal, the inverted fault signal, and the inverted interrupt count signal. For example only, the disabling module 260 may disable the regeneration interrupt module 230 when: (1) the current loading is less than the predetermined maximum loading; (2) the tip temperature is greater than the predetermined temperature for at least the predetermined period; (3) the pump 152 is being operated; (4) the dosing agent injector is injecting dosing agent; (5) the number of instances when the regeneration has been interrupted is greater than the predetermined number; and (6) one or more faults have been diagnosed in the treatment system.

Figure 3:
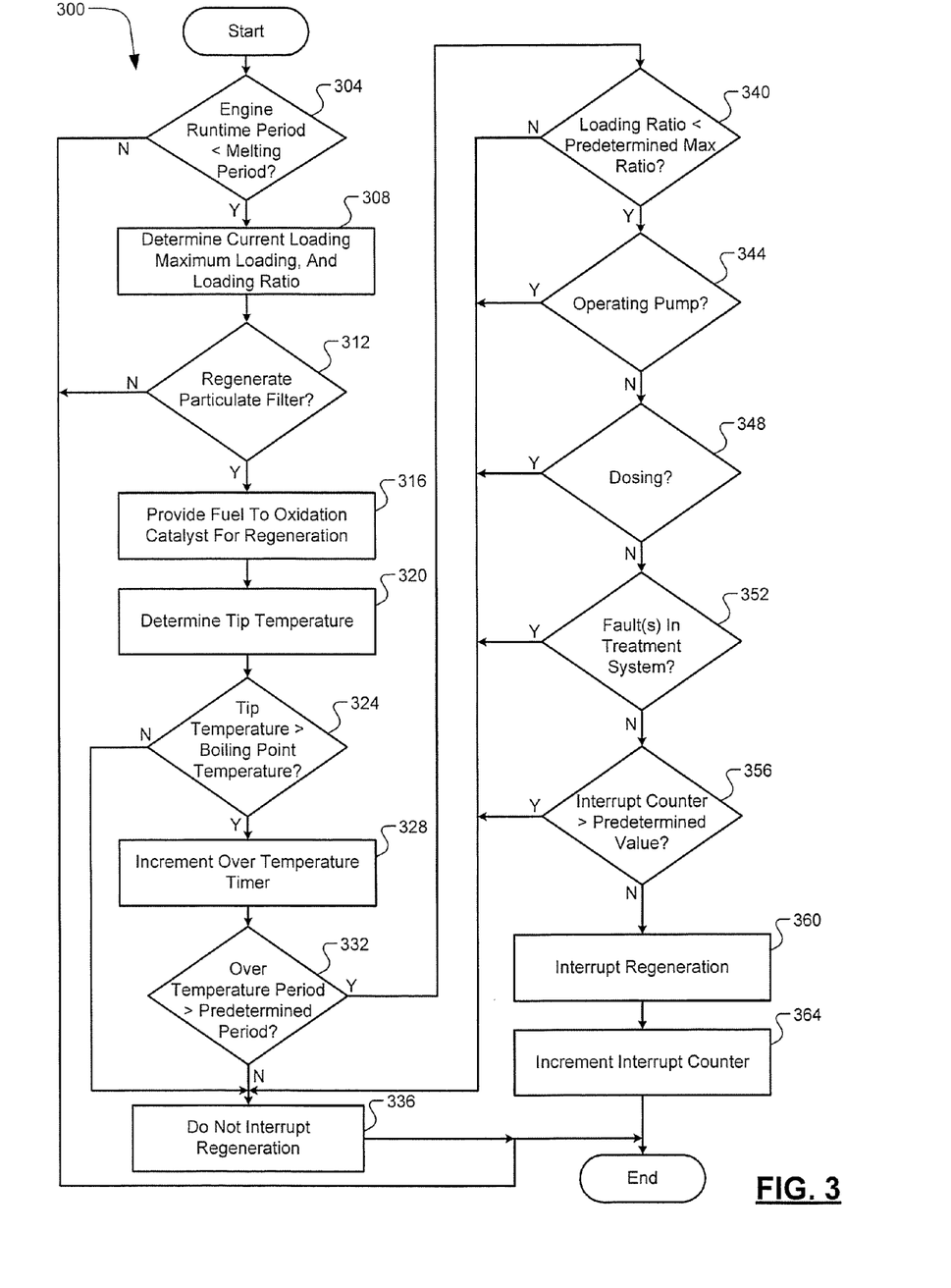
FIG. 3 is a flowchart depicting exemplary steps performed by a method according to the principles of the present disclosure.

Referring now to FIG. 3, a flowchart depicting exemplary steps 300 performed by a method is presented. Control may begin in step 304 where control determines whether the engine runtime period is less than the melting period. If true, control may continue to step 308; if false, control may end. The melting period may include approximately 70 minutes of runtime.

In step 308, control may determine the current loading of the PF 138 and the maximum loading of the PF 138. Control may also determine the loading ratio in step 308. Control may determine whether to regenerate the PF 138 in step 312. If true, control may continue to step 316; if false, control may end.

Control may regenerate the PF 138 in step 316 by providing fuel to the OC 130. Heat generated by the OC 130 via combustion of fuel may be used for the regeneration of the PF 138. Control may determine the tip temperature of the dosing agent injector 134 in step 320. In step 324, control may determine whether the tip temperature is greater than the predetermined maximum temperature. If true, control may increment the over temperature timer in step 328 and proceed to step 332. If false, control may disable interrupting the regeneration of the PF 138 in step 336, and control may end.

Control may determine whether the over temperature period is greater than the predetermined period in step 332. If true, control may continue to step 340; if false, control may disable interrupting the regeneration in step 336, and control may end. Control may determine whether the loading ratio is less than the predetermined maximum ratio in step 340. If true, control may continue to step 344; if false, control may disable interrupting the regeneration of the PF 138 in step 336, and control may end.

Control may determine whether the pump 152 is being operated in step 344. If true, control may disable interrupting the regeneration of the PF 138 in step 336, and control may end. If false, control may continue to step 348. In step 348, control may determine whether dosing agent is being injected. If true, control may disable interrupting the regeneration of the PF 138 in step 336, and control may end. If false, control may continue to step 352.

Control may determine whether one or more faults have been diagnosed in the treatment system in step 352. If true, control may disable interrupting the regeneration of the PF 138 in step 336, and control may end. If false, control may continue to step 356. Control may determine whether the interrupt counter is greater than the predetermined number of instances in step 356. In other words, control may determine whether the regeneration has been interrupted on at least the predetermined number of instances since the last regeneration in step 356. If true, control may disable interrupting the regeneration of the PF 138 in step 336, and control may end. If false, control may proceed to step 360.

Control may interrupt the regeneration of the PF 138 in step 360. For example only, control may disable the provision of fuel to the OC 130 in step 360. Control may then proceed to step 364 where control increments the interrupt counter. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A regeneration control system for a vehicle, comprising:
 a first electronic circuit configured to selectively provide fuel to an oxidation catalyst for a regeneration event of a particulate filter that occurs during a predetermined melting period for frozen dosing agent; and
 a second electronic circuit configured to selectively interrupt the regeneration event and disable the provision of fuel to the oxidation catalyst before the regeneration event is complete when a temperature of a dosing agent injector that is located between the oxidation catalyst and the particulate filter is greater than a predetermined temperature.

2. The regeneration control system of claim 1 further comprising a third electronic circuit configured to selectively disable the second electronic circuit when the temperature is greater than the predetermined temperature for at least a predetermined period during the regeneration event.

3. The regeneration control system of claim 1 further comprising a third electronic circuit configured to selectively disable the second electronic circuit when a dosing agent pump is providing dosing agent to the dosing agent injector during the regeneration event.

4. The regeneration control system of claim 1 further comprising a third electronic circuit configured to selectively disable the second electronic circuit when the dosing agent injector is injecting dosing agent during the regeneration event.

5. The regeneration control system of claim 1 further comprising a third electronic circuit configured to selectively disable the second electronic circuit when a loading amount of the particulate filter is greater than a maximum loading amount of the particulate filter.

6. The regeneration control system of claim 5 wherein the third electronic circuit is further configured to selectively disable the second electronic circuit when the loading amount is greater than the maximum loading amount by at least a predetermined amount.

7. The regeneration control system of claim 1 further comprising:
a third electronic circuit configured to track a number of instances when the second electronic circuit has interrupted the first electronic circuit before the regeneration event is complete; and
a fourth electronic circuit configured to selectively disable the second electronic circuit when the number is greater than a predetermined number.

8. The regeneration control system of claim 1 further comprising:
a third electronic circuit configured to selectively diagnose a fault in one or more components of an exhaust treatment system; and
a fourth electronic circuit configured to selectively disable the second electronic circuit when one or more faults have been diagnosed.

9. The regeneration control system of claim 1 wherein the second electronic circuit is configured to interrupt the regeneration event before the regeneration event is complete when, during the regeneration event, the temperature is greater than the predetermined temperature for less than a predetermined period, a dosing agent pump is disabled, injection of dosing agent is disabled, a number of instances when the second electronic circuit has interrupted the first electronic circuit is less than a predetermined number, and zero faults have been diagnosed.

10. The regeneration control system of claim 1 wherein the predetermined temperature corresponds to a predetermined boiling point temperature of dosing agent.

11. A regeneration control method for a vehicle, comprising:
selectively providing fuel to an oxidation catalyst for a regeneration event of a particulate filter that occurs during a predetermined melting period for frozen dosing agent; and
selectively interrupting the regeneration event and disabling the provision of fuel to the oxidation catalyst before the regeneration event is complete when a temperature of a dosing agent injector that is located between the oxidation catalyst and the particulate filter is greater than a predetermined temperature.

12. The regeneration control method of claim 11 further comprising selectively preventing the selective interruption and disabling when the temperature is greater than the predetermined temperature for at least a predetermined period during the regeneration event.

13. The regeneration control method of claim 11 further comprising a selectively preventing the selective interruption and disabling when a dosing agent pump is providing dosing agent to the dosing agent injector during the regeneration event.

14. The regeneration control method of claim 11 further comprising selectively preventing the selective interruption and disabling when the dosing agent injector is injecting dosing agent during the regeneration event.

15. The regeneration control method of claim 11 further comprising selectively preventing the selective interruption and disabling when a loading amount of the particulate filter is greater than a maximum loading amount of the particulate filter.

16. The regeneration control method of claim 15 further comprising selectively preventing the selective interruption and disabling when the loading amount is greater than the maximum loading amount by at least a predetermined amount.

17. The regeneration control method of claim 11 further comprising:
tracking a number of instances when the regeneration event has been interrupted before the regeneration event is complete; and
selectively preventing the selective interruption and disabling when the number is greater than a predetermined number.

18. The regeneration control method of claim 11 further comprising:
selectively diagnosing a fault in one or more components of an exhaust treatment system; and
selectively preventing the selective interruption and disabling when one or more faults have been diagnosed.

19. The regeneration control method of claim 11 further comprising interrupting the regeneration event before the regeneration event is complete when, during the regeneration event, the temperature is greater than the predetermined temperature for less than a predetermined period, a dosing agent pump is disabled, injection of dosing agent is disabled, a number of instances when the regeneration event has been interrupted is less than a predetermined number, and zero faults have been diagnosed.

20. The regeneration control method of claim 11 wherein the predetermined temperature corresponds to a boiling point temperature of dosing agent.

21. The regeneration control system of claim 1 wherein the first and second electronic circuits include at least one of an Application Specific Integrated Circuit (ASIC), a processor and memory including one or more programs, and a combinational logic circuit.

* * * * *